US012014713B2

(12) United States Patent
Forrest

(10) Patent No.: US 12,014,713 B2
(45) **Date of Patent: *Jun. 18, 2024**

(54) SYSTEMS AND METHODS FOR ACOUSTIC ABSORPTION

(71) Applicant: Chinook Acoustics, Inc., Redmond, WA (US)

(72) Inventor: Benjamin F. Forrest, Redmond, WA (US)

(73) Assignee: Chinook Acoustics, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,351

(22) Filed: Feb. 8, 2023

(65) Prior Publication Data

US 2023/0186888 A1 Jun. 15, 2023

Related U.S. Application Data

(63) Continuation of application No. 16/493,041, filed as application No. PCT/US2018/022439 on Mar. 14, 2018, now Pat. No. 11,620,974.

(60) Provisional application No. 62/471,787, filed on Mar. 15, 2017.

(51) Int. Cl.
*G10K 11/162* (2006.01)

(52) U.S. Cl.
CPC .................................. *G10K 11/162* (2013.01)

(58) Field of Classification Search
CPC .................................................... G10K 11/162
See application file for complete search history.

(56) References Cited

U.S. PATENT DOCUMENTS

| | | | |
|---|---|---|---|
| 2,130,919 | A | 9/1938 | Gunnar et al. |
| 2,694,025 | A | 11/1954 | Slayter et al. |
| 2,706,306 | A | 4/1955 | Sheetz et al. |
| 3,866,001 | A | 2/1975 | Kleinschmidt et al. |
| 3,867,995 | A | 2/1975 | Sanders |
| 4,193,474 | A | 3/1980 | Okubo et al. |
| 4,566,558 | A | 1/1986 | Link, Jr. et al. |
| 4,607,466 | A | 8/1986 | Allred |
| 4,842,097 | A | 6/1989 | Woodward et al. |
| 4,885,891 | A | 12/1989 | Lynch |
| 5,202,174 | A | 4/1993 | Capaul |
| 5,411,623 | A | 5/1995 | Shutt |

(Continued)

FOREIGN PATENT DOCUMENTS

| | | | |
|---|---|---|---|
| CN | 1243481 | A | 2/2000 |
| CN | 111016307 | A | 4/2020 |

(Continued)

OTHER PUBLICATIONS

International Search Report (ISR) and Written Opinion (WO) dated Jun. 28, 2018 for international application PCT/US2018/022439.

(Continued)

*Primary Examiner* — Forrest M Phillips
(74) *Attorney, Agent, or Firm* — Dorsey & Whitney LLC

(57) ABSTRACT

The present disclosure relates to an acoustic absorption system. The acoustic absorption system can include a curtain that includes one or more acoustic absorption panels. The curtain can be cleanable and/or sanitizable, and can be flame resistant. The curtain can also be coupled to an extension member.

20 Claims, 4 Drawing Sheets

(56) References Cited

U.S. PATENT DOCUMENTS

| | | | | |
|---|---|---|---|---|
| 5,511,348 | A | 4/1996 | Cornell et al. | |
| 5,765,334 | A | 6/1998 | Vitous | |
| 5,813,160 | A | 9/1998 | Thoelke | |
| 6,006,809 | A | 12/1999 | Williams et al. | |
| 6,077,613 | A | 6/2000 | Gaffigan | |
| 6,345,638 | B1 | 2/2002 | Warner | |
| 6,446,751 | B1 | 9/2002 | Ahuja et al. | |
| 6,478,039 | B2 | 11/2002 | Suh | |
| 6,575,656 | B2 | 6/2003 | Suh | |
| 6,613,424 | B1 | 9/2003 | Putt et al. | |
| 6,742,309 | B2 | 6/2004 | Stewart et al. | |
| 7,422,026 | B2 | 9/2008 | Kim | |
| 7,503,428 | B1 | 3/2009 | Johnson | |
| D624,768 | S | 10/2010 | Clark et al. | |
| 7,905,323 | B2 | 3/2011 | Larsen | |
| 7,913,812 | B2 | 3/2011 | Sanders | |
| 8,091,605 | B1 | 1/2012 | Melhart | |
| 8,136,626 | B1 | 3/2012 | Aliev | |
| 8,316,508 | B2 | 11/2012 | Lapping | |
| 8,544,218 | B2 | 10/2013 | Dellinger et al. | |
| 8,695,755 | B2 | 4/2014 | Mihaly | |
| 8,708,098 | B2 * | 4/2014 | Roy | E04F 15/20 181/290 |
| 8,839,842 | B2 * | 9/2014 | Ashelin | E04B 2/74 160/40 |
| 11,620,974 | B2 * | 4/2023 | Forrest | G10K 11/168 181/287 |
| 2003/0102184 | A1 | 6/2003 | Brisson et al. | |
| 2003/0219133 | A1 | 11/2003 | Horrall et al. | |
| 2004/0182430 | A1 | 9/2004 | Seo | |
| 2005/0161071 | A1 | 7/2005 | Tseng | |
| 2005/0268562 | A1 | 12/2005 | Thacher | |
| 2006/0042673 | A1 | 3/2006 | Tseng | |
| 2006/0247919 | A1 | 11/2006 | Specht et al. | |
| 2009/0107059 | A1 | 4/2009 | Kipp et al. | |
| 2010/0078260 | A1 | 4/2010 | McNeal, Jr. | |
| 2010/0175810 | A1 | 7/2010 | Korwin-Edson et al. | |
| 2010/0224442 | A1 | 9/2010 | Sanders | |
| 2012/0305042 | A1 * | 12/2012 | Lorbiecki | E04H 3/08 135/96 |
| 2013/0185061 | A1 | 7/2013 | Arvanaghi et al. | |
| 2013/0186706 | A1 | 7/2013 | Bliton et al. | |
| 2013/0199868 | A1 | 8/2013 | Bergiadis | |
| 2015/0003625 | A1 | 1/2015 | Uhle et al. | |
| 2015/0034415 | A1 * | 2/2015 | Furusawa | A47H 23/08 181/292 |
| 2015/0055790 | A1 | 2/2015 | Kawakami et al. | |
| 2015/0139435 | A1 | 5/2015 | Forrest et al. | |
| 2016/0253987 | A1 | 9/2016 | Chattell | |
| 2017/0221468 | A1 | 8/2017 | Forrest et al. | |
| 2019/0047774 | A1 | 2/2019 | Veiseh | |
| 2019/0156812 | A1 | 5/2019 | Bixel | |
| 2020/0013383 | A1 | 1/2020 | Forrest | |

FOREIGN PATENT DOCUMENTS

| | | | |
|---|---|---|---|
| CN | 111688599 | A | 9/2020 |
| EP | 0467867 | | 1/1992 |
| EP | 2919341 | A1 | 9/2015 |
| JP | 2009317047 | | 12/1997 |
| JP | 2009257080 | | 11/2009 |
| KR | 101415321 | B1 | 7/2014 |
| WO | 2008120071 | | 10/2008 |
| WO | 2018170131 | | 9/2018 |
| WO | 2020084802 | A1 | 4/2020 |

OTHER PUBLICATIONS

International Search Report and Written Opinion dated Feb. 18, 2022 received in International patent application No. PCT/US2021/057425.

Notice of Allowance dated Feb. 1, 2023 received in U.S. Appl. No. 16/493,041.

Forrest , Office Action dated Dec. 30, 2021 for U.S. Appl. No. 16/493,041.

Forrest , et al., Office Action dated Dec. 16, 2016 for U.S. Appl. No. 14/543,695.

Forrest , et al., Office Action dated Jun. 21, 2019 for U.S. Appl. No. 15/422,308.

Forrest , et al., Office Action dated May 26, 2016 for U.S. Appl. No. 14/543,695.

Lorbiecki , Office Action dated Jul. 24, 2013 for U.S. Appl. No. 13/153,202.

Lorbiecki , Office Action dated May 13, 2016 for U.S. Appl. No. 13/153,202.

Non-Final Office Action dated Oct. 12, 2023 issued in U.S. Appl. No. 17/452,964.

Non-Final Office Action dated Mar. 6, 2024 issued in U.S. Appl. No. 17/452,964.

* cited by examiner

SYSTEMS AND METHODS FOR ACOUSTIC ABSORPTION

CROSS-REFERENCE TO RELATED APPLICATIONS

This patent application is a continuation of U.S. patent application Ser. No. 16/493,041 entitled SYSTEMS AND METHODS FOR ACOUSTIC ABSORPTION, filed on Sep. 11, 2019, which is a U.S. National Stage filing under 35 U.S.C. 371 of International Patent Application No. PCT/US2018/022439 entitled SYSTEMS AND METHODS FOR ACOUSTIC ABSORPTION, filed on Mar. 14, 2018, which claims priority to U.S. Provisional Patent Application No. 62/471,787 entitled SYSTEMS AND METHODS FOR ACOUSTIC ABSORPTION, filed on Mar. 15, 2017, each of which is incorporated herein by reference in its entirety.

TECHNICAL FIELD

The present disclosure is generally directed towards systems and methods for acoustic absorption. More specifically, the disclosure relates to systems and methods for providing sound dampening, wherein the sound absorption system is able to be sterilized and/or prevent absorption of microbes and other contaminants into the sound absorbing medium.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
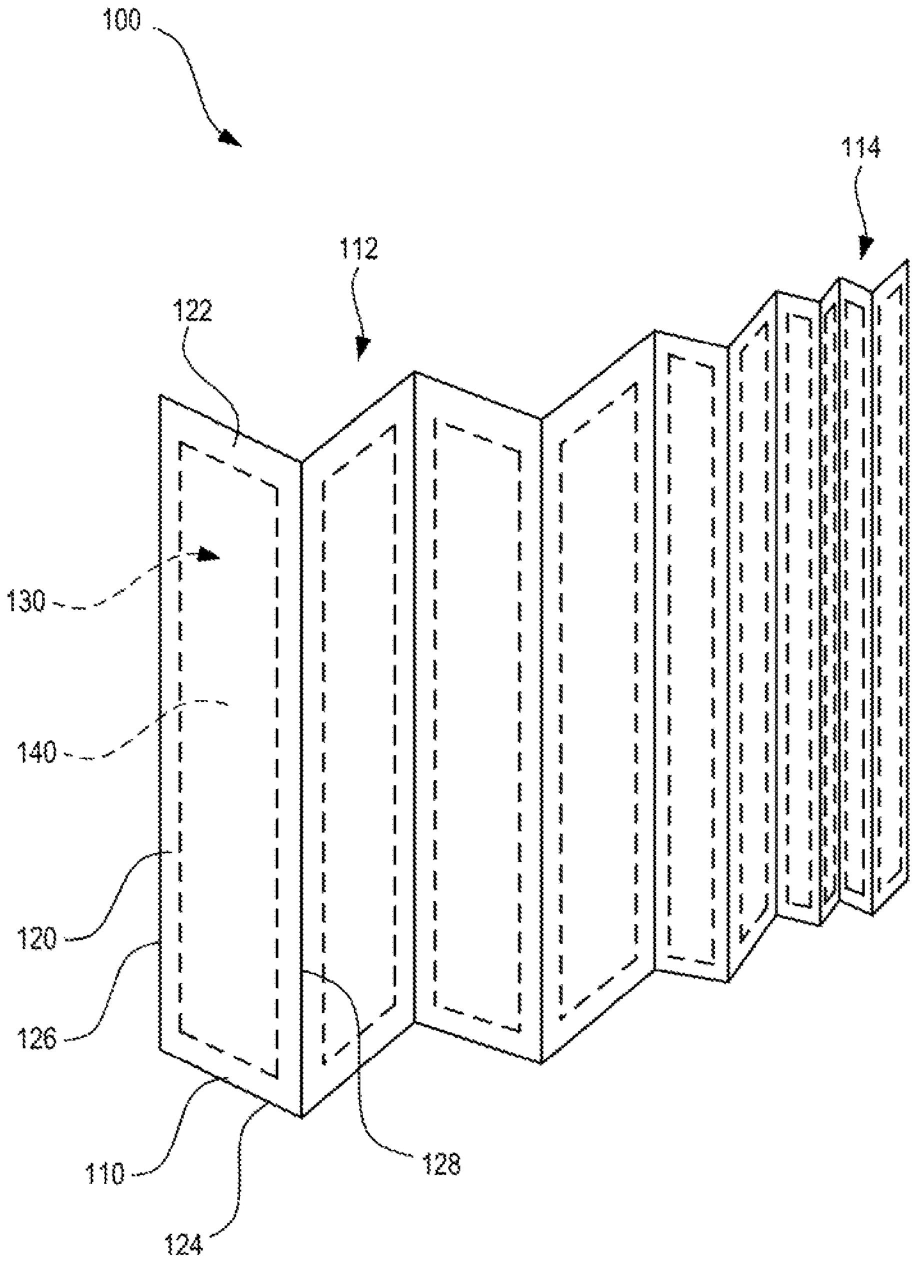
FIG. 1 is a perspective view of an acoustic absorption system, according to an embodiment of the present disclosure.

The embodiments of the present disclosure are generally directed towards systems and methods for acoustic absorption. Systems for providing sound absorption can reduce confusion, strain, anxiety, and miscommunication. Absorbing and/or controlling sound can also improve privacy, as the volume of a conversation can be dampened and/or reduced as it travels from one area to another. In some environments, sound absorption under sanitary conditions is particularly important, such as in medical facilities and laboratories. However, acoustic media generally comprise a porous material such as carbon fiber, polyurethane, polyester, fiberglass, other fibrous material, or other foam material. This can be especially problematic when contamination is a concern in the environment because porous materials create a location for contaminants to reside that is protected from many cleaning materials. Additionally, porous material can retain odor causing contaminants that may be unpleasant.

In a medical facility, for example, contaminants such as bacteria and viruses can spread diseases. In a laboratory, as another example, contaminants can affect experiments and procedures. In a restroom, as yet another example, contaminants can affect the odor of the room. The sound absorption systems within the scope of this disclosure may be sanitizable and not contaminant absorptive, and may be used, for example, within the environments as discussed above. As further detailed below, the sound absorption systems within the scope of this disclosure can also exhibit antimicrobial properties. The sound absorption systems can also be tear and/or flame resistant.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail. While the various aspects of the embodiments are presented in drawings, the drawings are not necessarily drawn to scale unless specifically indicated.

The phrases "connected to," "coupled to," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

FIG. 1 depicts an acoustic absorption system 100 according to an embodiment of the present disclosure. The acoustic absorption system 100 can be configured to reflect and/or absorb acoustical energy or sound. As shown in FIG. 1, the acoustic absorption system 100 can comprise a flexible curtain 110. The flexible curtain 110 comprises one or more acoustic absorption panels 120, each of which can comprise a pocket or compartment 130 (shown in phantom). A sound absorbing or insulating sheet 140 (shown in phantom) can also be disposed within the compartment 130. Exemplary types of curtains that can be used are described in U.S. Pat. No. 6,446,751, which is incorporated by reference in its entirety.

The panels 120 of the curtain 110 can be made of various types materials. In some embodiments, for example, the panels 120 comprise material that is sanitizable. In such embodiments, the panels 120 can be cleaned or cleansed, e.g., with water, soap, disinfectants (e.g., phenolic disinfectants), and/or other types of cleaners (e.g., bleach).

Cleanable and/or sanitizable panels 120 can be advantageous in many ways. For example, cleanable and/or sanitizable panels 120 can be economically advantageous when compared to disposable curtains that are disposed of after being used for a period of time. The cleanable and/or sanitizable panels 120 disclosed herein can also be wiped and/or otherwise cleaned in place (e.g., while remaining hung or draped from a wall or ceiling in an environment). In other words, the curtain 110 need not be removed for washing and/or laundering. Such clean-in-place curtains 110 can minimize and/or save on cleaning time and costs when compared to curtains that need to be removed (e.g., taken down), washed, and reinstalled on a reoccurring basis.

The material of the panels 120 can also be non-absorbent or substantially non-absorbent. The material of the panels 120 can also be resistant to staining. For example, the panels 120 can be resistant to stains from oils, greases, and/or other contaminants (e.g., blood and/or other bodily fluids). Stain resistance can also be advantageous and save on replacement costs for the curtains 110.

In further embodiments, the material of the panels 120 also exhibits antimicrobial properties. For example, the panels 120 can comprise antimicrobial agents that kill and/or inhibit the growth of microorganisms such as bacteria, fungi, etc. The panels 120 can also be odor resistant. For example, the panels 120 can be resistant to odors that arise from bacteria (or bacterial growth). As previously mentioned, the panels 120 are also non-absorbent or substantially non-absorbent, such that other odor sources are not absorbed (or substantially absorbed) into the panels 120. In some embodiments, the panels 120 comprise a material that exhibits antimicrobial properties in accordance with ISO 22196. In other words, the material achieves a pass rating when tested in accordance with ISO 22196.

In yet further embodiments, the panels 120 are also flame resistant. For example, the panels 120 can comprise a material (e.g., a fabric) that is flame resistant, or resistant to combustion. A flame resistant material can also be a material that is resistant to burning. For example, a flame resistant material can exhibit self-extinguishing properties such that it ceases to burn once a flame or heat source is removed from its vicinity. In some embodiments, the panels 120 comprise a material that is flame resistant in accordance with ASTM D6413. In other words, the material achieves a pass rating when tested in accordance with ASTM D6413.

The material of the panels 120 can also be strong, such that it is not easily torn or damaged. For example, the panels 120 can withstand cleaning and/or wiping procedures without being damaged or degraded by cleaning agents. And in still further embodiments, the panels 120 exhibit antistatic properties, such that they are resistant to the build-up of electrostatic charge.

In certain embodiments, the panels 120 comprise a polymeric material. Exemplary polymeric materials that can be used include polyethylene, polyethylene terephthalate (polyester), vinyls or polyvinyls (e.g., polyvinyl chloride, polyvinyl fluoride, etc.) including medical grade vinyls, copolymers, and/or blends thereof.

As further shown in FIG. 1, each panel 120 comprises a first edge 122 (or upper edge), a second edge 124 (or lower edge), a first lateral edge 126 (or first side edge), and a second lateral edge 128 (or second side edge). The lateral edges 126, 128 of adjacent panels are also coupled together. In some embodiments, individual panels 120 are formed from a single curtain 110. For example, a curtain 110 can be divided, such as by stitching elements or seals (e.g., heat seals or welds), to form a plurality of panels 110 and compartments 130. In other embodiments, a plurality of panels 120 can be joined together to form a curtain 110.

The panels 120 and curtain 110 are also flexible and/or non-rigid. In some embodiments, such as the embodiment depicted in FIG. 1, the curtain 110 can also be folded such that adjacent panels 120 become substantially superimposed with each other. A folded configuration can also be referred to as a closed or substantially closed configuration, while a non-folded or spread configuration can be referred to as an open or substantially open configuration. With reference to FIG. 1, for example, the panels 120 of the first section 114 are in a more folded or closed configuration as compared to the panels 120 of the second section 112, which are more spread apart. In still further embodiments, the panels 120 can be described as being disposed in an accordion-like fashion.

Figure 2A:
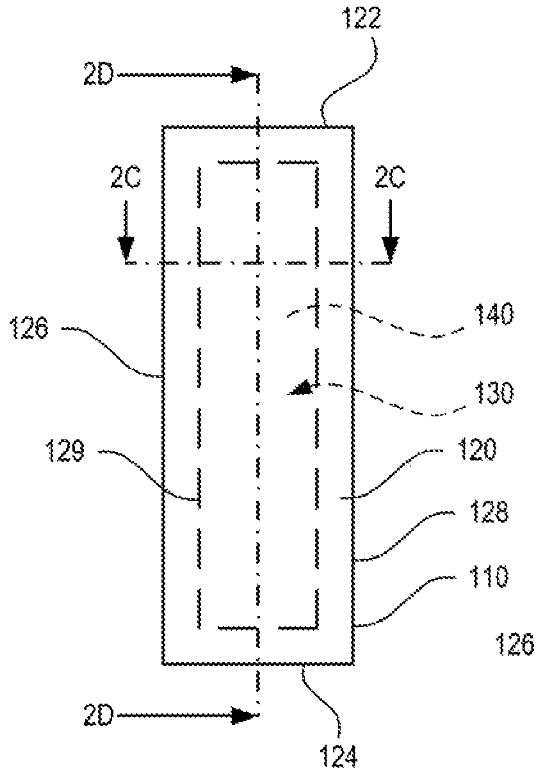
FIG. 2A is a plan view of an acoustic absorption panel, according to the embodiment of FIG. 1.
Figure 2B:
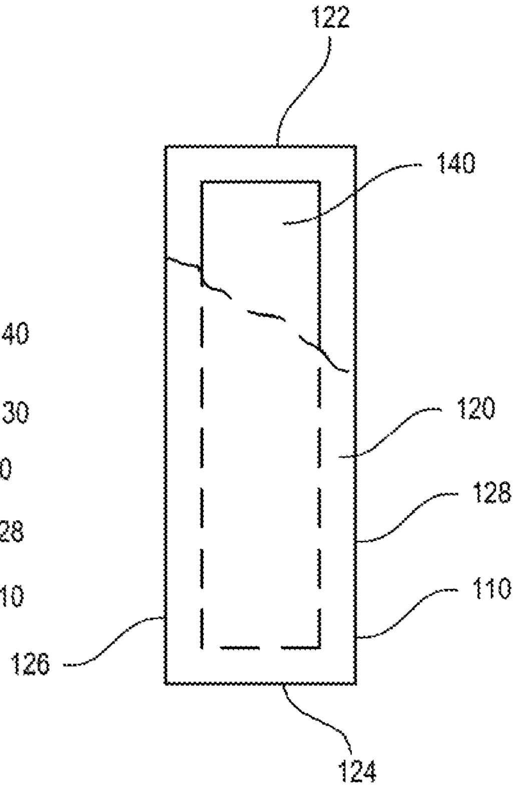
FIG. 2B is a plan view of the acoustic absorption panel of FIG. 2A, depicting a cut-away portion.
Figure 2C:
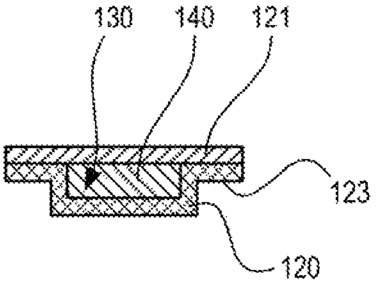
FIG. 2C is a cross-sectional view of the acoustic absorption panel of FIG. 2A, through plane 2C-2C of FIG. 2A.
Figure 2D:
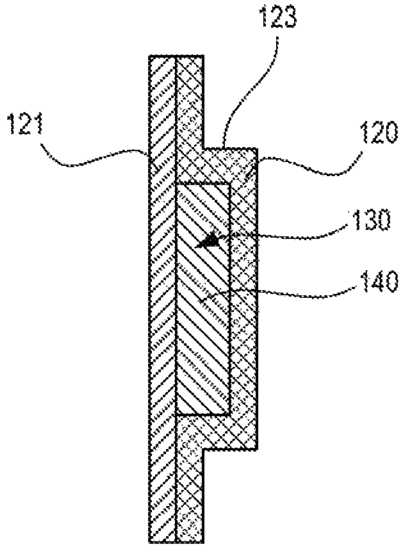
FIG. 2D is another cross-sectional view of the acoustic absorption panel of FIG. 2A, through plane 2D-2D of FIG. 2A.

FIGS. 2A-2D depict an acoustic absorbent panel 120, or a portion of the curtain 110 of FIG. 1. In particular, FIG. 2A depicts a plan view of the panel 120; FIG. 2B depicts a plan view of the panel 120 of FIG. 2A with a cut-away portion; FIG. 2C depicts a cross-sectional view of the panel 120 of FIG. 2A, taken along the viewing plane 2C-2C; and FIG. 2D depicts a cross-sectional view of the panel 120 of FIG. 2A, taken along the viewing plane 2D-2D.

As shown in FIGS. 2A-2D, the panel 120 comprises a compartment 130 that is disposed within the edges 122, 124, 126, 128 of the panel 120. An insulating or sound absorbing sheet 140 can also be disposed within the compartment 130. With reference to FIGS. 2C and 2D, in certain embodiments, the panel 120 extends around the periphery of the insulating sheet 140, such that the insulating sheet 140 can be described as being enclosed or encapsulated within the panel 120. As further shown in FIGS. 2C and 2D, the panel 120 can comprise a first face 121 and a second face 123. Each face 121, 123 can be formed of a segment of material, which can then be coupled or joined (e.g., through stitching, adhesives, seals etc.) to form the panel 120 and compartment 130 of the curtain 110.

For example, in one embodiment, an insulating or sound absorbing sheet 140 can be disposed between two faces 121, 123 or segments of material. The faces 121, 123 or segments of material can then be coupled or joined on one, two, three, or four sides of the insulating or sound absorbing sheet 140, which can then retain, enclose, or encapsulate the insulating or sound absorbing sheet 140. In a particular embodiment, the faces 121, 123 or segments of material are joined by a stitching element. In another embodiment, the faces 121, 123 or segments of material are joined by an adhesive. And in another embodiment, the faces 121, 123 or segments of material are joined by seals, such as heat seals or heat welds. The stitching element, adhesive, and/or seals (e.g., heat seals) can extend around a perimeter or a periphery of the insulating or sound absorbing sheet 140, or only a portion thereof as desired. In other embodiments, a portion of the compartment can be formed first (such as into a three-sided pocket-like structure), after which an insulating or sound absorbing sheet 140 can be disposed therein. As can be appreciated, the dashed line 129 which can represent the boundaries of a compartment 130, can also represent a stitching element or seal (e.g., heat seal), which can be continuous or discontinuous.

The insulating or sound absorbing sheet 140 can include various types of materials. Exemplary materials, include, but are not limited to, cotton, polyester, wool, rayon, hemp, burlap, other plant-based fabrics, and plastics.

The insulating sheet 140 can also comprise materials of various densities. In some embodiments, the insulating sheet 140 comprises multiple regions of material having different and distinct densities. Different densities of material can have different sound absorption capabilities and may target various frequency ranges of sounds. In some embodiments, the insulating sheet 140 comprises a material having a density of between about 1 and about 6 $lb/ft^3$, between about 2 and about 5 $lb/ft^3$, between about 3 and about 5 $lb/ft^3$, or between about 4 and about 5 $lb/ft^3$. In further embodiments, the insulating sheet 140 comprises a material having a density of about 4.5 $lb/ft^3$. And in yet further embodiments, the insulating sheet 140 comprises a material having a density of no greater than about 6 $lb/ft^3$, no greater than about 5 $lb/ft^3$, or no greater than about 4.5 $lb/ft^3$.

Various thicknesses of insulating sheets 140 can also be used. For example, in some embodiments, the thickness of the insulating sheet 140 is between about ¼ inch and about 1 inch, or between about ¼ inch and about ¾ inch. In further embodiments, the thickness of the insulating sheet 140 is about ½ inch.

Figure 3A:
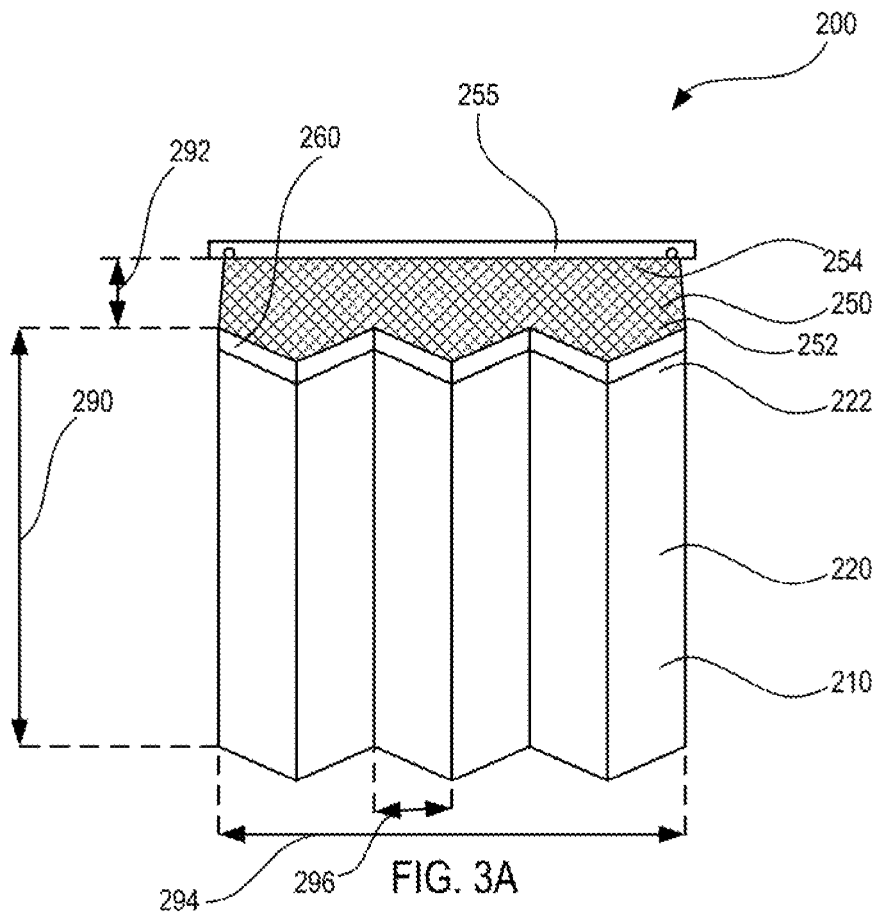
FIG. 3A is a perspective view of an acoustic absorption system, according to another embodiment of the present disclosure.
Figure 3B:
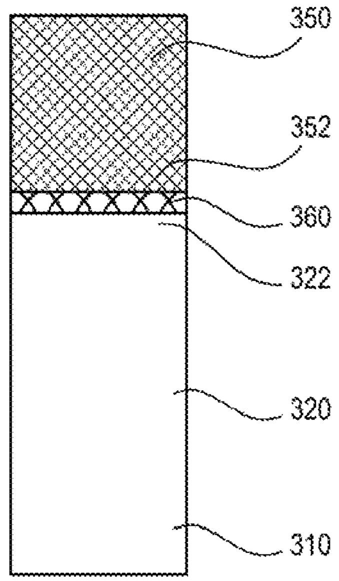
FIG. 3B is a plan view of an acoustic absorption panel, according to an embodiment of the present disclosure.
Figure 3C:
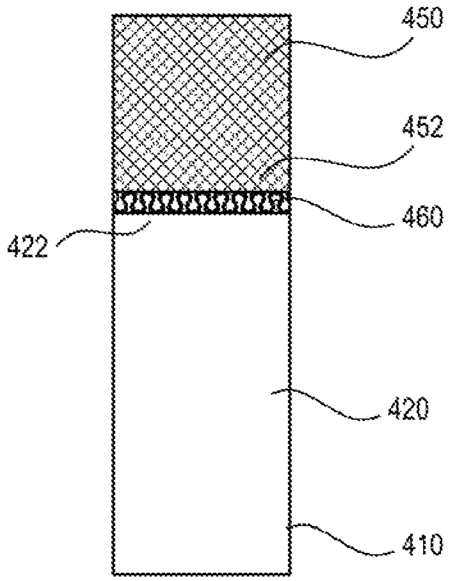
FIG. 3C is a plan view of an acoustic absorption panel, according to another embodiment of the present disclosure.

FIGS. 3A-3C are views of another embodiment of a sound absorbing system 200 comprising a curtain 210. The curtain 210 can, in certain respects, resemble components of the curtain 110 described in connection with FIG. 1 above. It will be appreciated that the illustrated embodiments may have analogous features. Accordingly, like features are designated with like reference numerals, with the leading digits incremented to "2." (For instance, the curtain is designated "110" in FIG. 1, and an analogous curtain is designated as "210" in FIG. 3A.) Relevant disclosure set forth above regarding similarly identified features thus may not be repeated hereafter. Moreover, specific features of the curtain 210 and related components shown in FIGS. 3A-3C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the curtain of FIGS. 3A-3C. Any suitable combination of the features, and variations of the same, described with respect to the curtain 210 and components illustrated in FIG. 1, can be employed with the curtain 210 and components of FIGS. 3A-3C, and vice versa. This pattern of disclosure applies equally to further embodiments disclosed herein.

As shown in FIG. 3A, in some embodiments a first edge or end 222 (e.g., an upper end) of the curtain 210 (or panel 220) can be coupled to a first end 252 of an extension member 250. A second end 254 of the extension member 250 can then be coupled to a rail, mount, wall, and/or ceiling structure 255. In some embodiments, the extension member 250 comprises a fabric or mesh material 250. Other types of materials can also be used.

The curtain 210 can be coupled to the extension member 250 in various ways. For example, in certain embodiments, the curtain 210 is coupled at a coupling region 260 using a permanent fastener such as a stitching element. Other types of permanent fasteners can be used, including, but not limited to, staples, adhesives, seals (e.g., heat seals), etc. Permanent fasteners can be configured to permanently couple the curtain 210 to the extension member 250.

In other embodiments, the curtain 210 is coupled at a coupling region 260 using a temporary fastener such as a zipper element. Other types of temporary fasteners can also be used, including, but not limited to hook and hook fasteners, and hook and loop fasteners. Temporary fasteners can be configured to temporarily couple the curtain 210 to the extension member 250. For example, a temporary fastener can be configured such that the curtain 210 can be removed from the extension member 250 at a user's discretion. As can be appreciated, one portion of the fastener (e.g., zipper, hook and hook closure, etc.) can be disposed on the curtain 210, while a second complementary portion of the fastener can be disposed on the extension member 250.

In some embodiments, temporary fasteners can be advantageous. For example, curtains 210 using a temporary fastener can be easily removed, while leaving the extension member 250 coupled to the rail, mount, wall, and/or ceiling structure 255. For example, a curtain 210 can be removed for cleaning (e.g., wiping), and later recoupled to the extension member 250. As another example, a first curtain 210 can be uncoupled from the extension member 250 and replaced with a second curtain 210, which is then coupled to the extension member 250.

FIG. 3B depicts a panel 320 of a curtain 310 coupled to an extension member 350 using a permanent fastener. In particular, a first end 322 of the panel 320 is coupled to a first end 352 of the extension member 350 at a coupling region 360 using a stitching element. Other types of permanent fasteners can also be used.

FIG. 3C depicts a panel 420 of a curtain 410 coupled to an extension member 450 using a temporary fastener. In particular, a first end 422 of the panel 420 is coupled to a first end 452 of the extension member 450 at a coupling region 460 using a zipper element. As can be appreciated, one portion of the zipper element can be disposed on the curtain 410, while a second complementary portion of the zipper element can be disposed on the extension member 450. Other types of temporary fasteners can also be used.

Figure 4:
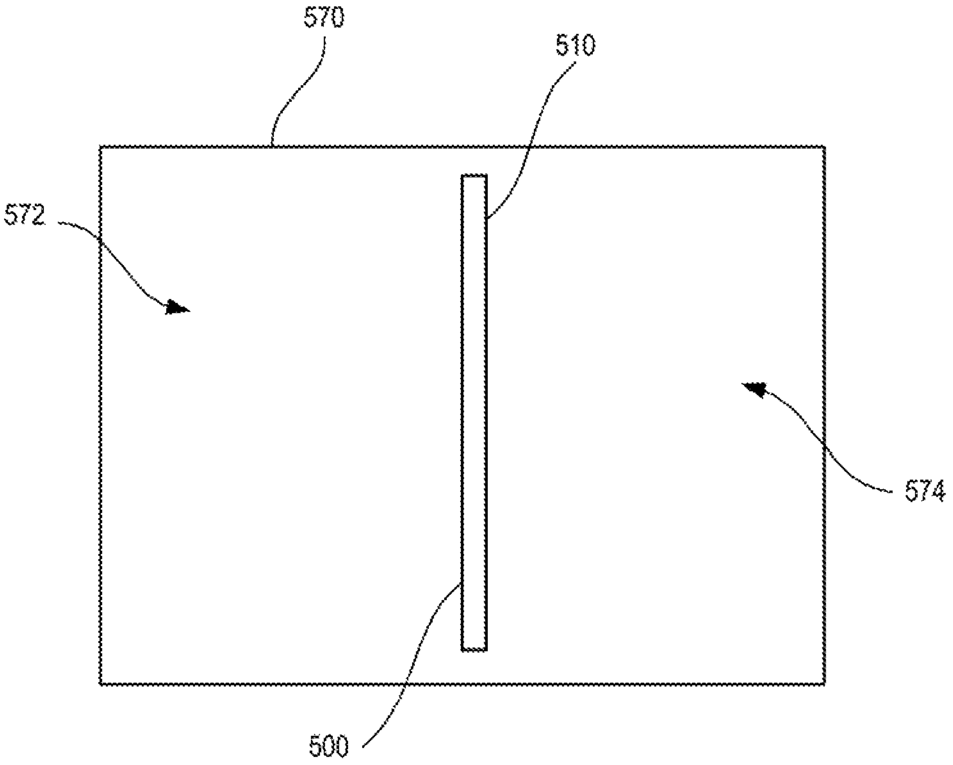
FIG. 4 is a plan view of an area having an acoustic absorption system disposed therein, according to another embodiment of the present disclosure.

Methods of making and/or using the acoustic absorption systems are also disclosed herein. In particular, it is contemplated that any of the components, principles, and/or embodiments discussed above may be utilized in either an acoustic absorption system or a method of making and/or using the same. An illustrative method of using an acoustic absorption system, according to one embodiment of the present disclosure, is depicted in FIG. 4. As shown in FIG. 4, in one embodiment a method of using the acoustic absorption system 500 can comprise controlling noise in an area 570. For example, the acoustic absorption system 500 can be configured to absorb sound or noise. The acoustic absorption system 500 can also be configured to reflect sound, such that the sound is at least partially retained within an isolated area.

In some embodiments, the method includes a step of obtaining an acoustic absorption system 500 comprising a flexible curtain 510 as disclosed herein. The method can further include a step of disposing the acoustic absorption system 500 (e.g., such as from a ceiling or mounting structure) in an area 570 such that the acoustic absorption system 500 divides the area 570 into a first sub-area 572 and a second sub-area 574. When disposed in such a manner, the acoustic absorption system 500 can be configured to dampen, absorb, or otherwise reduce the volume of a sound (such as a sound from a conversation, or a sound from a device (e.g., tv, radio, equipment, etc.), etc.) originating in either the first or second sub-area 572, 574. For example, the acoustic absorption system 500 can be configured to at least partially absorb sound, dampen, or otherwise reduce the volume of a sound traveling from the first sub-area 572 into the second sub-area 574, and vice versa. The acoustic absorption system 500 can also be configured to at least partially reflect sound, thereby at least partially retaining the sound within the sub area 572, 574 in which the sound is originated.

In certain embodiments, the method can also include a step of cleaning or sanitizing the acoustic absorption system, optionally while the acoustic absorption system remains in place. The method can also include a step of removing the acoustic absorption system, such as uncoupling the flexible curtain from an extension member, and recoupling the flexible curtain with the extension member (or coupling a second flexible curtain with the extension member). Additional steps, and/or methods, can also be employed.

An illustrative method of making an acoustic absorption system can include a step of forming a panel that comprises an insulating or sound absorbing sheet. For example, in one embodiment, an insulating or sound absorbing sheet or material can be disposed between two faces or segments of panel forming material. The faces or segments of panel forming material can then be coupled or joined to one another. For instance, the faces or segments of panel forming material can be joined on one, two, three, or four sides of the insulating or sound absorbing sheet to form at least a portion of a boundary or perimeter around the insulating or sound absorbing sheet. In certain embodiments, the faces or segments are joined such that the insulating or sound absorbing sheet is retained, enclosed, or encapsulated by the material of the panel.

The segments of panel forming material can be joined in various ways, such as by a stitching element, an adhesive, or a seal (e.g., a heat seal). The segments of panel forming material can also be joined continuously around the perimeter or periphery of the insulating or sound absorbing sheet, or intermittently at spaced apart regions.

In another illustrative method, the segments of panel forming material can be joined (e.g., with a stitching element, adhesive, and/or seals (e.g., heat seals)) to form a portion of a compartment prior to disposing the insulating or sound absorbing sheet therein. For instance, a two or three-sided pocket like structure can be formed, after which an insulating or sound absorbing sheet can be disposed therein. Optionally, the remaining portion of the perimeter or periphery can thereafter be closed or sealed if desired. Additional steps, and/or methods, can also be employed.

As can be appreciated, the curtain employed by the methods and/or systems disclosed herein can be various sizes. For example, in some embodiments, the curtain, which optionally comprises an extension member, can extend from a ceiling structure to the floor (or an area near the floor). With continued reference to FIG. 3A, in some embodiments, the height 290 of the curtain 210 (excluding the extension member 250) can be between about 60 and about 90 inches, between about 62 and about 88 inches, between about 64 and about 86 inches, or between about 66 and about 84 inches. In some of such embodiments, the height 292 of the extension member 250 can be between about 12 and about 40 inches, or between about 18 and about 36 inches.

In some embodiments, the width 294 of the curtain 210 is between about 48 and about 84 inches, or between about 54 and about 72 inches. In other embodiments, the width 294 of the curtain 210 is between about 24 and about 36 inches. Other heights, widths, and/or sizes of curtains can also be used.

Further, the panels 220 of the curtains 210 can be various sizes. For example, in certain embodiments, the width 296 of the panels 220 of the curtain 210 can be between about 4 and about 8 inches, or between about 5 and about 7 inches. In other embodiments, the width 296 of the panels 220 is about 6 inches. The number of panels 220 can also vary. For example, in certain embodiments, the curtain 210 comprises between about 6 and about 12 panels, or between about 8 and about 12 panels 220. In other embodiments, the curtain 210 comprises between about 4 and 6 panels 220. In yet further embodiments, the curtain comprises no greater than about 12 panels 220. The number of panels 220, the width 296 of the panels 220, and the thickness of the panels 220 can also be selected such that the curtain 210 folds appropriately.

EXAMPLES

The following examples are exemplary and are not intended to be exhaustive of the embodiments disclosed herein.

Example 1

A flexible acoustic absorption curtain was prepared using a cleanable, flame resistant, polymeric material. The curtain was coupled to a mesh extension member using a zipper element. The height of the curtain was about 84 inches, and the height of the extension member was about 18 inches. The width of the curtain was about 60 inches. The curtain included 10 panels, each panel being about 6 inches wide. Each panel further included a compartment having an insulating sheet disposed therein. The insulating sheets were formed using polyester having a density of about 4.5 $lb/ft^3$. The thickness of the insulating sheets was about ½ inch.

The curtain was hung from a ceiling structure and absorbed sound well. The curtain was also able to be opened and closed, with each panel being substantially superimposable on an adjacent panel. The curtain was also flexible and cleansable. The curtain was also easily uncoupled from the extension member by uncoupling the zipper element.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. Further, all ranges include both endpoints.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims and their equivalents.

The invention claimed is:

1. An acoustic absorption system, comprising:

a flexible curtain comprising a plurality of acoustic absorption panels, wherein each acoustic absorption panel comprises a compartment with an insulating sheet disposed therein;

wherein each compartment is at least partially joined on each side of the insulating sheet disposed therein to retain the insulating sheet therein, and wherein the flexible curtain comprises a cleanable, flame resistant, polymeric material.

2. The acoustic absorption system of claim 1, wherein the polymeric material comprises polyethylene, polyethylene terephthalate, vinyl, polyvinyl, or a blend thereof.

3. The acoustic absorption system of claim 1, wherein the insulating sheet comprises a cotton, polyester, wool, rayon, hemp, burlap, or plastic material.

4. The acoustic absorption system of claim 1, wherein the flexible curtain comprises an antimicrobial material that achieves a pass rating when tested in accordance with ISO 22196.

5. The acoustic absorption system of claim 1, wherein the polymeric material comprises a flame resistant material that achieves a pass rating when tested in accordance with ASTM D6413.

6. The acoustic absorption system of claim 1, wherein a top edge of the flexible curtain is coupled to an extension member.

7. The acoustic absorption system of claim 6, wherein the flexible curtain is coupled at a coupling region using a permanent fastener.

8. The acoustic absorption system of claim 6, wherein the flexible curtain is coupled at a coupling region using a temporary fastener.

9. The acoustic absorption system of claim 1, wherein each compartment is at least partially joined by at least one of a stitching element, an adhesive, or a seal.

10. The acoustic absorption system of claim 1, wherein the each compartment is joined continuously around a periphery of the insulating sheet disposed therein.

11. The acoustic absorption system of claim 1, wherein the each compartment is joined discontinuously around a periphery of the insulating sheet disposed therein.

12. An acoustic absorption system, comprising:

a flexible curtain comprising a plurality of acoustic absorption panels, wherein each acoustic absorption panel comprises a compartment with an insulating sheet disposed therein;

wherein each acoustic absorption panel is at least partially joined on four sides around the insulating sheet to retain the insulating sheet in the compartment, wherein the flexible curtain comprises a cleanable, flame resistant, polymeric material.

13. The acoustic absorption system of claim 12, wherein each acoustic absorption panel is at least partially joined by at least one of a stitching element, an adhesive, or a seal.

14. A method for controlling noise in an area, comprising:

obtaining an acoustic absorption system comprising a flexible curtain comprising a plurality of acoustic absorption panels, wherein each acoustic absorption panel comprises a compartment with an insulating sheet disposed therein, wherein each compartment is at least partially joined on each side of the insulating sheet disposed therein to retain the insulating sheet therein, and wherein the flexible curtain comprises a cleanable, flame resistant, polymeric material; and disposing the acoustic absorption system in the area such that the acoustic absorption system divides the area into a first sub-area and a second sub-area, wherein the acoustic absorption system is configured to at least partially absorb a sound originating in the first sub-area.

15. The method of claim 14, wherein the flexible curtain comprises an antimicrobial material that achieves a pass rating when tested in accordance with ISO 22196.

16. The method of claim 14, wherein the flexible curtain comprises a fire resistant material that achieves a pass rating when tested in accordance with ASTM D6413.

17. The method of claim 14, wherein a top edge of the flexible curtain is coupled to an extension member, and wherein the extension member comprises a fabric or mesh material.

18. The method of claim 17, wherein the flexible curtain is coupled at a coupling region using one or more of a zipper, a hook and hook fastener, or a hook and loop fastener.

19. The method of claim 14, wherein the acoustic absorption system is configured to reduce the volume of the sound traveling from the first sub-area into the second sub-area.

20. The method of claim 14, further comprising a step of:

cleaning the acoustic absorption system while the acoustic absorption system remains disposed in the area.

* * * * *